United States Patent [19]
Lewis

[11] B  3,923,487
[45]  Dec. 2, 1975

[54] METHOD OF MAKING GLASS AMPULS IN A NON-CONTAMINATING MANNER
[75] Inventor: Albert D. Lewis, Toledo, Ohio
[73] Assignee: Owens-Illinois, Inc., Toledo, Ohio
[22] Filed: Nov. 13, 1972
[21] Appl. No.: 305,881
[44] Published under the Trial Voluntary Protest Program on January 28, 1975 as document no. B 305,881.

Related U.S. Application Data
[62] Division of Ser. No. 170,555, Aug. 10, 1971, Pat. No. 3,719,463.

[52] U.S. Cl. .................................. 65/110; 65/112
[51] Int. Cl.[2] ......................................... C03B 23/12
[58] Field of Search ............. 65/105, 108, 110, 112, 65/113

[56] References Cited
UNITED STATES PATENTS
| | | | |
|---|---|---|---|
| 2,582,818 | 1/1952 | Coby | 65/105 |
| 3,375,948 | 4/1968 | Creevy et al. | 65/105 X |
| 3,719,463 | 3/1973 | Lewis | 65/113 |

*Primary Examiner*—Arthur D. Kellogg
*Attorney, Agent, or Firm*—Richard B. Dence; E. J. Holler

[57]  ABSTRACT

A method of making ampuls and releasing a partial vacuum in the glass ampul, created when glass ampuls are formed from tubing, by using a small hydrogen-oxygen flame about 0.005 inch in port diameter to effect a self-sealing hole in the ampul, and equalizing atmospheric pressure within the ampul, permitting the ampul to be opened for filling, in a subsequent operation, without drawing glass particles into the ampul, due to the in-rushing atmosphere, during the second opening procedure. Sterile water vapor, produced by the flame, fills the ampul to the exclusion of atmospheric air, and maintains the interior of the ampul in its original sterile condition during the vacuum release.

The improved ampul is vacuum released, hermetically sealed, and sterile.

1 Claim, 4 Drawing Figures

U.S. Patent   Dec. 2, 1975   3,923,487
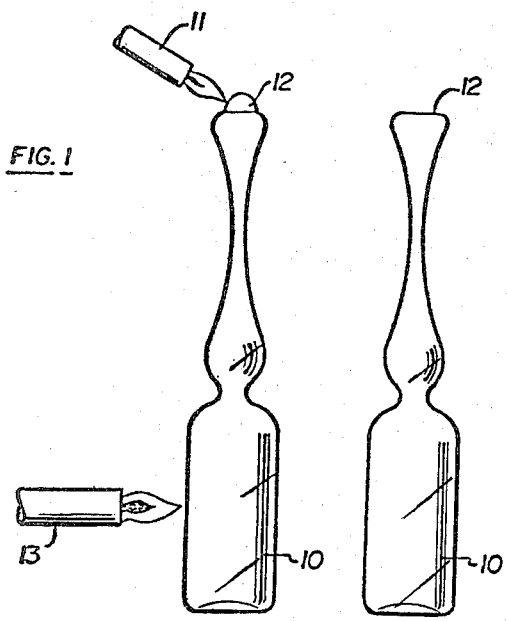
FIG. 1
FIG. 2
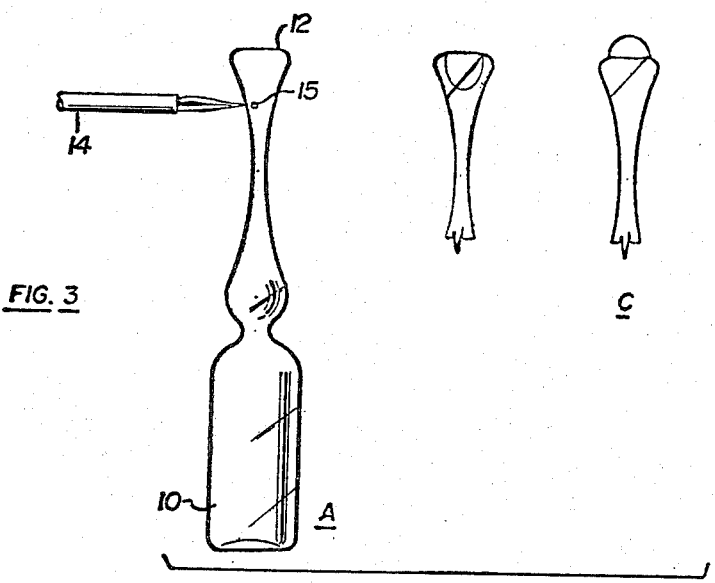
FIG. 3
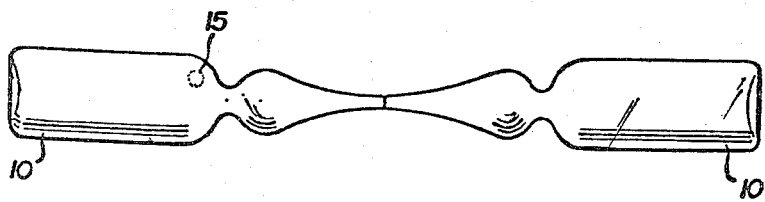
FIG. 4

METHOD OF MAKING GLASS AMPULS IN A NON-CONTAMINATING MANNER

CROSS-REFERENCE TO RELATED APPLICATION

This application is a divisional application of application, Ser. No. 170,555, filed Aug. 10, 1971, now U.S. Pat. No. 3,719,463.

BACKGROUND OF THE INVENTION

1. Field of the Invention

This invention is a method of releasing a partial vacuum created within glass ampuls when the ampuls are formed from tubing, sealed, and cooled to room temperature.

A small area is heated with a very small hydrogen-oxygen flame. As the glass softens, atmospheric pressure opens the soft area and releases the partial vacuum without introducing either glass particles or bacteriological contamination. Sterile water vapor, a product of the flame, fills the vented ampul, thus maintaining the interior of the ampul in its sterile condition; and the puncture is self-sealed immediately upon vacuum release and before withdrawal of the flame.

2. Description of the Prior Art

This invention can be utilized in prior art methods of making at least two kinds of ampuls. Ampuls are manufactured with either a "funnel-top" or a "trimmed stem." Glass tubing is formed in an ampul-forming machine by heating and then forming the tube in the shape of an ampul, which is sealed during the manufacture, creating a partial vacuum within the ampul. In this condition, the annealed ampul is internally sterile; to open the ampuls, in the prior art practice, a large diameter flame is used on the body of the ampul to increase the pressure while a sharp, concentrated flame is directed at the top thereof to melt an opening in the formed ampul; however, the procedure for opening the ampul draws into the ampul atmospheric air, which carries the small glass particles, dust, and attendant bacterial microbiological contamination. The ampul requires washing to remove this contamination and also sterilization prior to subsequent filling with pharmaceutical material. If the body of the ampul is not heated to expand the air, then the partial vacuum draws in large numbers of glass particles originating from the forming of the opening.

The above method is used for both funnel top or (when the top is trimmed) trimmed stem ampuls. In both types, the upper or stem portion is discarded as a wasted piece of glass.

By making a "double body" common stem ampul, the formed ampul can be severed by mechanical means, heat shock, or flame melting; but glass particles are introduced throughout the ampuls by the in-rushing of air as a result of the particle vacuum within the ampul. An application of the method of this invention is to release the vacuum prior to the severing operation so that, during any subsequent severing operation, glass chips are not brought into the body of the ampuls by the in-rushing atmosphere, but are limited to the tip area of the formed ampul, and these chips are easily removed by a vibration technique or washing, prior to use by the customer, permitting the more economic manufacture of ampuls through obtaining two ampuls per forming machine cycle and also avoiding waste, i.e., the discarded upper stem portion.

Another application of the method of this invention permits the vacuum release and resealing of a funnel top ampul without introducing glass particles. After this vacuum release operation, single funnel top ampuls can now be opened, using a prior art method, for filling a single funnel top ampul with pharmaceutical material without the usual contamination, washing, and sterilization, and double body common stem ampuls can be severed without introducing glass particles.

SUMMARY OF THE INVENTION

A method of releasing a partial vacuum in a sealed glass ampul, thereby equalizing the pressure in the ampul with atmospheric pressure and re-sealing the ampul without introducing glass particles or bacterial contamination. The method is the use of a very small hydrogen-oxygen flame tip, about 0.005 inch port diameter, so adjusted to heat the glass but not sufficient to pierce the ampul in the absence of the partial vacuum. Atmospheric pressure then forces a small vent in the glass; the pressure is equalized on both sides of the glass wall, and the vent or opening seals itself, leaving a small blemish or scar on the ampul surface. The flame tip, at a temperature of over 3,000°F., produces an atmosphere of sterile water vapor within the ampul and maintains the sterile condition present prior to piercing. The vent closes immediately upon pressure equalization and before withdrawal of the flame, due to the flow of molten glass.

BRIEF DESCRIPTION OF THE DRAWINGS

FIG. 1 shows a prior art method of opening an ampul for vacuum release.

FIG. 2 shows an ampul after use of the prior art opening method.

FIG. 3 shows the method of this invention in vacuum-releasing an ampul of the funnel top or "Tuf top" type.

FIG. 4 shows a common stem double ampul of the invention.

DESCRIPTION OF THE PREFERRED EMBODIMENTS

FIG. 1 shows a prior art method of opening formed sealed ampul 10, either at a later stage of ampul manufacture or any time prior to filling, utilizing a flame 11 to soften the top 12 of the ampul and a second flame 13 on the ampul body to prevent the partial vacuum from collapsing the softened spot and causing the ampul top to assume a concave shape, as shown by the dotted line of FIG. 1. The body flame expands the internal air which expands the heated top glass. The prior art method is shown to provide a better basis for understanding the improved method of this invention.

FIG. 3 shows the steps of the method of this invention. A very hot hydrogen-oxygen flame 14 with a port approximately 0.005 inch is applied to the ampul, and a small spot is heated on the surface of the ampul. Atmospheric pressure causes a small hole to form and the products of combustion from the flame to surge into the ampul, resulting in equalized pressure within the ampul and the atmosphere. With the equalizing of pressure, the small hole in the glass seals itself almost instantly, and the flame may be withdrawn. The method of this invention preserves the sterile condition of the ampul, which can be packed and shipped to a customer. During the customer's filling operations, the thin top is pierced with a needle point flame for introduction of the filling needle. These operations on externally clean and sterile ampuls are conducted under sterile conditions, eliminating the need for costly internal washing and sterilizing the ampuls prior to filling and sealing.

FIG. 1 shows the prior art practice of opening an ampul for filling; a flame is used to soften a portion of the glass ampuls near the top, while a second flame warms the air within the ampul and prevents the top of the ampul from collapsing inwardly, as shown in FIG. 1. A funnel top ampul, shown in FIG. 2, results when a large hole is flame-pierced in the top to permit the entry of washing and filling needles for funnel top ampuls; such ampuls, due to contamination on opening, packaging and shipment, require intricate and expensive interior washing and sterilization before filling. Some ampuls are sold and presented to users in an unopened condition and, of course, they are not "vacuum released," but the contamination problem occurs when the customer vacuum-releases the ampul.

The method of this invention permits the vacuum-release and resealing of an ampul without introducing either glass particles or contaminated air which would result in the loss of a sterile interior condition. After vacuum release operation, the ampul is shipped to a customer for filling under sterile conditions, when a fire is used to make a port for the filling needle entry, the vacuum release operation of this invention permits forming the entry port without also introducing glass particles or spicules.

As shown in FIG. 4, double ampuls can be made from a common stem double body stock without causing the glass particles to contaminate the inner body of the ampul at severing. The glass tube is heated to deformation temperature, the ends are sealed, and the center is constricted to form two sealed ampul bodies.

This invention is a process of using a very small hydrogen-oxygen flame with a tip about 0.005 inch to heat a very small area on the ampul. Atmospheric pressure then pushes open the molten glass to form a small opening, and the opening permits the equalization of atmospheric pressure within the ampul. Then, the pierced hole seals itself; however, where sterile conditions are not a concern and clean air conditions are maintained, the heating step can be done by other means, such as laser beams, etc.

FIG. 4 illustrates the formation of a double ampul with the trimmed stem, the ampul being severed at line S. L. by any severing means, such as thermal shock, into two separate ampuls. This method provides an economical way to make trimmed stem ampuls and results in an economic benefit by eliminating the tiny glass particles that would otherwise pervade the ampul bodies, and also eliminate waste glass "stems" and permit two ampuls to be made during each forming cycle, instead of one ampul as in the prior art.

The flame is a hydrogen-oxygen mixture, which is supplied from source tanks and combined and supplied through a flame tip. The flame port is reduced in size to about 0.005 inch. The prescribed size would not, in the absence of a vacuum in the ampul, penetrate the glass. As the flame softens the glass, the atmospheric pressure begins to push the molten glass inwardly, forming a vent until pressure within the ampul and the atmosphere are equalized. The opening in the glass immediately seals itself due, probably, to the flow of the molten glass into the small opening.

Referring to the drawing, FIG. 1 illustrates the prior art method of vacuum releasing a sealed ampul and establishing a filling hole in the area designated 12. This is a "funnel top" ampul, as shown in FIG. 2.

FIG. 3 illustrates a sealed sterile ampul, which is formed as a result of the use of the process of the invention described herein. The surface to be opened may be flat as at A, concave as at B, or convex, as at C, to suit customer preference.

FIG. 4 shows a common stem ampul of the double type, made by the process of this invention.

Applicant's invention provides two methods of making ampuls that could not be made heretofore in the prior art. One is the hermetically-sealed, clean, sterile ampul that can be readily opened, filled, and re-sealed without interior contamination, such as that of the prior art funnel top ampul. The other is a common stem ampul, as shown in FIG. 4, which is formed from a one-piece tubing and severed into two trimmed stem ampuls.

Heretofore, it has been considered impractical to ship such a sealed ampul to a potential user because the customer's attempt to open the ampul has resulted in the objectionable glass particles and contamination referred to herein above. Heretofore, it has been necessary to subsequently wash the ampul interior and sterilize prior to filling and sealing at the customer location. This method makes it possible to manufacture funnel top ampuls, leaving them in heat-sealed, untrimmed condition, but vacuum-released. This permits elimination of internal washing and sterilizing of ampuls prior to pharmaceutical filling - a significant cost factor in making ampuls. Trimmed stem ampuls can be made from double body common stem ampul stock, which permits significant cost reduction and material conservation in the manufacture of trim stem ampuls.

I claim:

1. A method of forming two ampuls which are hermetically sealed and vacuum released from a one-piece glass tube comprising the steps of:

heating a glass tube to a deformation temperature;

forming two ampul bodies by sealing the ends of said tube and drawing the center section of the tube to a degree to form a constricted portion thus forming a sealed ampul body at each end of the end portion of the tube length;

applying a small hydrogen oxygen flame about 0.005 inches in diameter to each ampul body to soften a portion of the glass, and then through the combined effort of the effect of the softened glass and a pressure difference within the ampuls due to a partial vacuum established during the forming process, forming a small hole in the glass ampul body thereby releasing the vacuum and equalizing the interior and exterior air pressure;

removing said flame thereby causing the formed hole to close immediately while the glass of the ampul body is still softened thus hermetically sealing the ampul; and severing the common glass stem in the constricted section between the ampul bodies to form two sterile vacuum released ampuls from a one-piece glass tube.

* * * * *